US010597499B2

(12) United States Patent
Inoubli et al.

(10) Patent No.: US 10,597,499 B2
(45) Date of Patent: Mar. 24, 2020

(54) POLYMER COMPOSITION, ITS METHOD OF PREPARATION, ITS USE AND COMPOSITION COMPRISING IT

(71) Applicant: Arkema France, Colombes (FR)

(72) Inventors: Raber Inoubli, Villeurbanne (FR); Rosangela Pirri, Montardon (FR); Philippe Hajji, Chatillon D'Azergues (FR)

(73) Assignee: Arkema France, Colombes (FR)

( * ) Notice: Subject to any disclaimer, the term of this patent is extended or adjusted under 35 U.S.C. 154(b) by 82 days.

(21) Appl. No.: 15/536,168

(22) PCT Filed: Dec. 23, 2015

(86) PCT No.: PCT/EP2015/081142
§ 371 (c)(1),
(2) Date: Jun. 15, 2017

(87) PCT Pub. No.: WO2016/102658
PCT Pub. Date: Jun. 30, 2016

(65) Prior Publication Data
US 2017/0362395 A1 Dec. 21, 2017

(30) Foreign Application Priority Data
Dec. 24, 2014 (FR) ..................... 14 63304

(51) Int. Cl.
C08J 3/22 (2006.01)
C08L 51/06 (2006.01)
(Continued)

(52) U.S. Cl.
CPC .............. C08J 3/22 (2013.01); C08L 51/04 (2013.01); C08L 51/06 (2013.01); C08L 63/00 (2013.01);
(Continued)

(58) Field of Classification Search
None
See application file for complete search history.

(56) References Cited

U.S. PATENT DOCUMENTS 4,778,851 A   10/1988 Henton et al.
6,043,293 A   3/2000 Belik et al.
(Continued)

FOREIGN PATENT DOCUMENTS

EP    1 123 711 A1    11/2009
EP    2 934 866        2/2010
WO    WO 2008/060545 A1    5/2008

OTHER PUBLICATIONS

JER Epoxy Resin Catalogue, The Kaiteki Company; (Rev. Oct. 1, 2016).
(Continued)

Primary Examiner — Randy P Gulakowski
Assistant Examiner — Ha S Nguyen
(74) Attorney, Agent, or Firm — Lynn B. Morreale

(57) ABSTRACT

The present invention relates to a polymer composition comprising an epoxy resin and a multistage polymer. In particular the present invention it relates to polymer composition comprising an epoxy resin and a multistage polymer that can be used as a masterbatch. More particularly the present invention relates also to a process for preparing a polymer composition comprising an epoxy resin and a multistage polymer by spray drying or coagulation.

12 Claims, 1 Drawing Sheet

Comparative example 1 aggregates of MP1

(51) Int. Cl.
*C08L 51/04* (2006.01)
*C08L 63/00* (2006.01)

(52) U.S. Cl.
CPC ........ *C08J 2363/00* (2013.01); *C08J 2451/04* (2013.01); *C08J 2451/06* (2013.01); *C08J 2463/00* (2013.01)

(56) References Cited

U.S. PATENT DOCUMENTS

| | | | | |
|---|---|---|---|---|
| 6,111,015 | A * | 8/2000 | Eldin | B32B 5/26 |
| | | | | 525/65 |
| 6,313,221 | B1 * | 11/2001 | Yabuta | C08G 59/4207 |
| | | | | 525/117 |
| 7,485,680 | B2 | 2/2009 | Furukawa et al. | |
| 8,217,089 | B2 | 7/2012 | Ueno et al. | |
| 2007/0027233 | A1 | 2/2007 | Yamaguchi et al. | |
| 2008/0188609 | A1 * | 8/2008 | Agarwal | C08L 51/04 |
| | | | | 524/504 |
| 2012/0142820 | A1 | 6/2012 | Yamaguchi et al. | |
| 2013/0115442 | A1 * | 5/2013 | Sang | C08G 59/4253 |
| | | | | 428/327 |

OTHER PUBLICATIONS

Third Party Observation for application No. EP 20150820161.
Polymer Properties, pp. 52-53, Polymer Products from Aldrich.

* cited by examiner

Comparative example 1

Example 1

US 10,597,499 B2

POLYMER COMPOSITION, ITS METHOD OF PREPARATION, ITS USE AND COMPOSITION COMPRISING IT

CROSS-REFERENCE TO RELATED APPLICATIONS

This application claims priority under 35 U.S.C. § 371 of PCT/EP2015/081142, filed Dec. 23, 2015 which claims benefit to application :FR14.63304, filed Dec. 24, 2014.

FIELD OF THE INVENTION

The present invention relates to a polymer composition comprising an epoxy resin and a multistage polymer.

In particular the present invention it relates to polymer composition comprising an epoxy resin and a multistage polymer that can be used as a masterbatch.

More particularly the present invention relates also to a process for preparing a polymer composition comprising an epoxy resin and a multistage polymer by spray drying or coagulation.

TECHNICAL PROBLEM

Thermoset polymers are most widely used as matrix material in composite materials. A thermoset polymer is an infusible, insoluble polymer network. One possibility to obtain a thermoset polymer is by curing reaction of a thermosetting resin, such as an epoxy resin, with a hardener or curing agent.

Due to the high crosslinking density the material is provided with a high glass transition temperature, which yields to excellent thermomechanical properties of the material. However the impact strength properties of thermoset polymers are insufficient for numerous applications.

Usually a rubber material is added in order to increase the impact strength.

Such a rubber can be a multistage polymer in form of core shell particles, with one stage that is a rubber.

The multistage polymer in form of core shell particles are available as agglomerated dry powder, the latter are dispersed in the matrix in order to obtain a homogenous distribution. For certain thermosetting resins and especially epoxy resin it is very difficult or nearly impossible to disperse correctly these multistage polymer particles.

It exists also a complex technology to incorporate a multistage polymer in form of core shell particles without drying the multistage polymer after its synthesis process in an epoxy resin by progressively changing the continuous dispersion medium of the core shell particle from water to an organic solvent.

The objective of the present invention is to obtain polymer composition comprising a multistage polymer that can be easily dispersed in non cured epoxy resins.

An objective of the present invention is also to have an efficient and homogenous distribution of the multistage polymer in epoxy resins.

Another objective of the present invention is to avoid agglomerated multistage polymer particles.

An additional objective of the present invention is toughening the matrix of cured epoxy resins due to a homogenous distribution of impact modifier in form of a multistage polymer.

Still another objective of the present invention is a process for manufacturing a polymer composition comprising a multistage polymer that can be easily dispersed in non cured epoxy resins.

Still an additional objective is having a process for preparing polymer composition comprising a multistage polymer that can be easily dispersed in non cured epoxy resins and having an efficient and homogenous distribution of the multistage polymer in epoxy resins.

Still a further objective is the use of a polymer composition comprising a multistage polymer that is masterbatch for the impact modification of epoxy resins.

Still another objective of the present invention is a process for manufacturing a polymer composition in form of a free flowing dry powder comprising an epoxy resin and a multistage polymer for use as a masterbatch for the impact modification of epoxy resins with a homogenous distribution of the multistage polymer.

BACKGROUND OF THE INVENTION

Prior Art

The document EP 0 228 450 discloses rubber modified epoxy compounds. The composition comprises a continuous epoxy resin phase and a discontinuous phase of rubber particles dispersed in the continuous phase. The rubber particles are grafted rubber particles. The rubber particles are dispersed in the epoxy phase with a mixing or shearing device.

The document EP 0 911 358 discloses the use of block-copolymers as impact modifiers in epoxy resin. However block copolymers are relatively expensive and it is preferred to disperse standard core-shell impact modifiers in the epoxy resin.

The document FR 2934866 discloses polymer preparation of a specific core shell polymer with functional shell comprising hydrophilic monomers. The core shell polymers are used as impact modifiers in thermoset polymers.

The document EP 1 632 533 describes a process for producing modified epoxy resin. The epoxy resin composition is having rubber like polymer particles dispersed in it by a process that brings the particles in contact with an organic medium that disperses the rubber particles.

The document EP 1 666 519 discloses a process for producing rubbery polymer particle and process for resin composition containing the same.

The document EP 2 123 711 discloses a thermosetting resin composition having a rubbery polymer particle dispersed therein and process for production thereof.

None of the prior art documents discloses a composition as claimed or a process for obtaining it.

BRIEF DESCRIPTION OF THE INVENTION

Surprisingly it has been found that a polymer composition comprising
a) an epoxy resin said epoxy E1 is solid at a temperature below 25° C., and
b) a multi stage polymer,
wherein the multi stage polymer makes up at least 20 wt % of the composition that can be easily dispersed in epoxy resin E2.

Surprisingly it has also been found that a polymer composition comprising
a) a epoxy resin E1, said epoxy E1 is solid at a temperature below 25° C., and
b) a multi stage polymer,
wherein the multi stage polymer makes up at least 20 wt % of the composition that can be used as masterbatch for epoxy resins.

Surprisingly it has also been found that a process for manufacturing a polymer composition comprising the steps of
   a) mixing of a epoxy resin E1, said epoxy E1 is solid at a temperature below 25° C., and a multi stage polymer
   b) recovering the obtained mixture of previous step
wherein the epoxy resin E1 and the multi stage polymer in step a) are in form of a dispersion in aqueous phase that yields to a polymer composition that can be used as masterbatch for epoxy resins.

Surprisingly it has also been found that a polymer composition comprising
   a) an epoxy resin E1 said epoxy E1 is solid at a temperature below 25° C., and
   b) a polymer obtained by a multistage process with
      a) one stage (A) comprising a polymer (A1) having a glass transition temperature of less then 0° C.
      b) one stage (B) comprising a polymer (B1) having a glass transition temperature of at least 30° C.,
wherein polymer obtained by the multistage process makes up at least 20 wt % of the composition a)+b) and can be easily dispersed in epoxy resin E2 and can be used as masterbatch for epoxy resins.

DETAILED DESCRIPTION OF THE INVENTION

According to a first aspect, the present invention relates to a polymer composition comprising
   an epoxy resin E1, said epoxy E1 is solid at a temperature below 25° C., and
   a multi stage polymer,
wherein the multi stage polymer makes up at least 20 wt %, preferably at least 30 wt %, more preferably at least 40% and advantageously at least 50 wt % of the composition.

According to a second aspect, the present invention relates to a polymer composition comprising
   an epoxy resin E1, said epoxy E1 is solid at a temperature below 25° C., and
   a multi stage polymer, said the multi stage polymer comprises
      a) one stage (A) comprising a polymer (A1) having a glass transition temperature of less then 0° C.
      b) one stage (B) comprising a polymer (B1) having a glass transition temperature of at least 30° C.,
wherein the multi stage polymer makes up at least 20 wt %, preferably at least 30 wt %, more preferably at least 40% and advantageously at least 50 wt % of the composition.

In a third aspect the present invention relates to a process for manufacturing a polymer composition comprising the steps of
   a) mixing of an epoxy resin E1, said epoxy E1 is solid at a temperature below 25° C., and a multi stage polymer
   b) recovering the obtained mixture of previous step
wherein the epoxy resin E1 and the multi stage polymer in step a) are in form of a dispersion in aqueous phase.

In a fourth aspect the present invention relates to the use of a polymer composition comprising
   an epoxy resin E1, said epoxy is solid at a temperature below 25° C., and
   a multi stage polymer,
wherein the multi stage polymer makes up at least 20 wt %, preferably at least 30 wt %, more preferably at least 40% and advantageously at least 50 wt % of the composition, as masterbatch for epoxy resins.

In a fifth aspect the present invention relates to a process for manufacturing a polymer composition comprising the steps of
   a) mixing of an epoxy resin E1, said epoxy E1 is solid at a temperature below 25° C., and a multi stage polymer
   b) recovering the obtained mixture of previous step
wherein the epoxy resin E1 and the multi stage polymer in step a) are in form of a dispersion in aqueous phase, for the use as masterbatch for epoxy resins.

In a sixth aspect the present invention relates to a process for manufacturing a masterbatch polymer composition comprising the steps of
   a) mixing of an epoxy resin E1, said epoxy E1 is solid at a temperature below 25° C., and a multi stage polymer
   b) recovering the obtained mixture of previous step
wherein the epoxy resin E1 and the multi stage polymer in step a) are in form of a dispersion in aqueous phase.

By the term "polymer powder" as used is denoted a polymer comprising powder grains in the range of at least 1 micrometer (µm) obtained by agglomeration of primary polymer or polymers or oligomers comprising particles in the nanometer range.

By the term "primary particle" as used is denoted a spherical polymer comprising particles in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "epoxy resin" as used is understood any organic compound having at least two functional groups of oxirane type which can be polymerized by ring opening. Once cured the epoxy resin will be a thermoset polymer.

By the term "epoxy resin that is solid below certain temperature" is understood that the epoxy resin has either a melting point $T_m$ above this certain temperature or a glass transition temperature $T_g$ or softening point above this certain temperature, depending on the chemical structure of the epoxy resin. Preferably the softening point (Mettler Cyup and Ball) is used as estimated according to ASTM D6090-99.

By the term "liquid epoxy resin" is understood that the epoxy resin has either a melting point $T_m$ below this certain temperature or a glass transition temperature $T_g$ or softening point below this certain temperature, depending on the chemical structure of the epoxy resin. Usually a liquid epoxy resin is characterized by its Brookfield viscosity at 25° C. according to ASTM D 2196-05.

By the term "masterbatch" as used is understood composition that comprises an additive in high concentration in a carrier material. The additive is dispersed in the carrier material.

With regard to the epoxy resin E1 according to the invention it is solid at a temperature below 25° C., preferably below 50° C., more preferably below 60° C. and still more preferably below 70° C.

These epoxy resins can be monomeric or polymeric, on the one hand, aliphatic, cycloaliphatic, heterocyclic or aromatic, on the other hand. Mention may be made, as examples of such epoxy resins based on resorcinol diglycidyl ether, bisphenol A diglycidyl ether, triglycidyl-p-amino-phenol, bromobisphenol F diglycidyl ether, the triglycidyl ether of m-amino-phenol, tetraglycidyl-methylenedianiline, the triglycidyl ether of (trihydroxyphenyl)methane, polyglycidyl ethers of phenol-formaldehyde novolak, poly-glycidyl ethers of ortho-cresol novolak and tetraglycidyl ethers of tetraphenyl-ethane. Mixtures of at least two of these resins can also be used as long as the epoxy resin is solid at a temperature below 25° C., preferably below 50° C. more preferably below 60° C. and still more preferably below 70° C.

The polymer composition according to the invention comprising epoxy resin E1, said epoxy E1 is solid at a temperature below 25° C., and the multi stage polymer, said polymer composition is a solid composition.

The polymer composition according to the invention comprising epoxy resin E1, said epoxy E1 is solid at a temperature below 25° C., and the multi stage polymer does not comprise any liquid epoxy resin. By liquid epoxy resin is meant a resin that is liquid at a temperature below 25° C., preferably below 50° C., and more preferably below 60° C. and still more preferably below 70° C.

The multistage polymer according to the invention has at least two stages that are different in its polymer composition.

The multistage polymer is preferably in form of spherical polymer particles. These particles are also called core shell particles. The first stage forms the core, the second or all following stages the respective shells.

With regard to the spherical polymer particle, it has a weight average particle size between 20 nm and 800 nm. Preferably the weight average particle size of the polymer is between 25 nm and 600 nm, more preferably between 30 nm and 550 nm, still more preferably between 35 nm and 500 nm, advantageously between 40 nm and 400 nm, more advantageously between 50 nm and 400 nm, still more advantageously between 75 nm and 350 nm and most advantageously between 80 nm and 300 nm.

The polymer particle has a multilayer structure comprising at least one layer (A) comprising a polymer (A1) having a glass transition temperature below 0° C. and another layer (B) comprising a polymer (B1) having a glass transition temperature over 30° C. Preferably the polymer (B1) having a glass transition temperature over 30° C. is the external layer of the polymer particle having the multilayer structure. Preferably the stage (A) is the first stage and the stage (B) comprising polymer (B1) is grafted on stage (A) comprising polymer (A1).

The polymer particle is obtained by a multistage process such as a process comprising two, three or more stages. The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure. Preferably the polymer (A1) is having a glass transition temperature below −5° C., more preferably below −15° C., advantageously below −25° C.

Preferably the polymer (B1) having a glass transition temperature over 30° C. is made in the last stage of the multistage process forming the external layer of the polymer particle having the multilayer structure.

There could be additional intermediate layer or layers obtained by an intermediate stage or intermediate stages The glass transition temperature Tg of the respective polymers of the multistage polymer can be estimated for example by dynamic methods as thermo mechanical analysis.

With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less then 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less then 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

In a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

In a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 70 wt % of monomer units coming from methyl methacrylate.

Preferably the glass transition temperature Tg of the polymer (B1) is between 30° C. and 150° C. The glass transition temperature of the polymer (B1) is more preferably between 60° C. and 150° C., still more preferably between 80° C. and 150° C., advantageously between 90° C. and 150° C. and more advantageously between 100° C. and 150° C.

With regard to the process for manufacturing the multistage polymer according to the invention, it comprises the steps of
  a) polymerizing by emulsion polymerization of a monomer or monomers mixture ($A_m$) to obtain one layer (A) comprising polymer (A1) having a glass transition temperature of less then 0° C.
  b) polymerizing by emulsion polymerization of a monomer or monomers mixture ($B_m$) to obtain layer (B) comprising a polymer (B1) having a glass transition temperature of at least 30° C.

the monomer or monomers mixture ($A_m$) and the monomer or monomers mixture ($B_m$) are chosen from respective monomers according to the composition for polymer (A1) and polymer (B1) given earlier.

Preferably the step a) is made before step b). More preferably step b) is performed in presence of the polymer (A1) obtained in step a), if there are only two stages.

Advantageously the process for manufacturing the multistage polymer composition according to the invention is a multistep process comprises the steps one after the other of
  a) polymerizing by emulsion polymerization of a monomer or monomers mixture ($A_m$) to obtain one layer (A) comprising polymer (A1) having a glass transition temperature of less then 0° C.
  b) polymerizing by emulsion polymerization of a monomer or monomers mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less then 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the polymer composition according to the invention, it comprises the steps of
  a) mixing of an epoxy resin E1, said epoxy E1 is solid at a temperature below 25° C., and the multi stage polymer
  b) recovering the obtained mixture of previous step in form of a polymer powder
wherein the epoxy resin E1 and the multi stage polymer in step a) are in form of a dispersion in aqueous phase.

The quantities of the aqueous dispersion of the epoxy resin E1 and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the epoxy resin E1 and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the epoxy resin E1 and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition according to the invention is preferably made by coagulation or by spray drying.

If the epoxy resin E1 according to the invention is solid at a temperature below 25° C., the recovering step is made preferably by coagulation.

If the epoxy resin E1 according to the invention is solid at a temperature below 70° C., the recovering step is made by spray drying or coagulation.

The process for manufacturing the polymer composition according to the invention can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition according to the invention yields preferably to a polymer powder. The polymer powder of the invention is in form of particles. A polymer powder particle comprises agglomerated primary polymer particles made by multistage process and the epoxy resin E1.

With regard to the polymer powder of the invention, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably at least 10 μm.

The D90 of the particle size distribution in volume is at most 950 μm and preferably at most 500 μm, more preferably at most 400 μm.

The polymer powder made of the composition according to the invention comprising epoxy resin E1, said epoxy E1 is solid at a temperature below 25° C., and the multi stage polymer is a solid free flowing powder at 20° C.

The polymer powder made of the composition according to the invention comprising epoxy resin E1, said epoxy E1 is solid at a temperature below 25° C., and the multi stage polymer does not comprise any liquid epoxy resin at a temperature below 25° C.

Preferably the polymer powder of the invention comprises the epoxy resin E1, said epoxy E1 is solid at a temperature below 25° C., as a continuous phase and the multi stage polymer as dispersed phase.

The composition of the invention in form of the powder is a solid powder at 20° C. as the epoxy resin itself is solid at a temperature below 25° C. and the multi stage polymer comprises the layer (B) comprising a polymer (B1) having a glass transition temperature of at least 30° C.

The present invention relates also to the use of the polymer composition according to the invention in form of the polymer powder as master batch in thermosetting resins. Preferably the thermosetting resin is an epoxy resin E2.

The master batch is blended with the other resin. The ratio of the master batch used is at most 90 wt % in view to the composition containing the thermosetting resin and the polymer composition according to the invention. The ratio of the master batch used is at least 10 wt % in view to the composition containing the thermosetting resin and the polymer composition according to the invention.

In another embodiment the polymer composition according to the invention can also be used as it is.

The present invention concerns as additional aspect an epoxy resin comprising polymer composition.

With regard to the epoxy resin comprising polymer composition according to the invention it comprises
  a) an epoxy resin E2 and
  b) an epoxy resin E1 said epoxy E1 is solid at a temperature below 25° C., and
  c) a multi stage polymer,
characterized that the multistage polymer makes up at least 5 wt % of the composition Preferably the epoxy resin comprising polymer composition according to the invention it comprises
  a) an epoxy resin E2 and
  b) an epoxy resin E1 said epoxy E1 is solid at a temperature below 25° C., and
  c) a polymer obtained by a multistage process comprising
      one stage (A) comprising a polymer (A1) having a glass transition temperature of less then 0° C.
      one stage (B) comprising a polymer (B1) having a glass transition temperature of at least 30° C.,
characterized that the multistage polymer makes up at least 5 wt % of the composition.

The multistage polymer and the epoxy resin E1 are the same as defined before.

The respective stages (A) and (B), respectively comprising the polymers (A1) and (B1) respectively and the characteristics of the respective polymers (A1) and (B1) are the same as defined before.

An still additional aspect of the invention regards to the process for manufacturing the the epoxy resin comprising polymer composition according to the invention which comprises
  a) an epoxy resin E2 and
  b) an epoxy resin E1 said epoxy E1 is solid at a temperature below 25° C., and
  c) a multi stage polymer,
comprising the step of
  a) mixing polymer powder made of the composition comprising epoxy resin E1, said epoxy E1 is solid at a temperature below 25° C., and the multi stage polymer with the epoxy resin E2.

The multistage polymer and the epoxy resin E1 are the same as defined before.

With regard to the epoxy resin E2, according to the invention it can be any organic compound having at least two functional groups of oxirane type which can be polymerized by ring opening.

The epoxy resin E2 could be the same as the epoxy resin E1.

The epoxy resin E2 could be different from the epoxy resin E1. The epoxy resin E2 could be solid or liquid. By the term "epoxy resin that is liquid below certain temperature" is understood that the epoxy resin has either a melting point $T_m$ below this certain temperature or a glass transition temperature $T_g$ below this certain temperature.

These epoxy resin E2 can be monomeric or polymeric, on the one hand; aliphatic, cycloaliphatic, heterocyclic or aromatic, on the other hand.

Preferably the epoxy resin E2 is a chosen from epoxy resins based on resorcinol diglycidyl ether, bisphenol A diglycidyl ether, triglycidyl-p-amino-phenol, bromobisphenol F diglycidyl ether, the triglycidyl ether of m-aminophenol, tetraglycidylmethylenedianiline, the triglycidyl ether of (trihydroxy-phenyl)methane, polyglycidyl ethers of phenol-formaldehyde novolak, poly-glycidyl ethers of ortho-cresol novolak and tetraglycidyl ethers of tetraphenylethane. Mixtures of at least two of these resins can also be used.

The epoxy resin comprising polymer composition according to the invention comprises between 1% and 90% of polymer obtained by the multistage process.

With regard to a variation of the process for manufacturing the epoxy resin comprising polymer composition according to the invention, it comprises the step of mixing epoxy resin E2 with a masterbatch said master batch is a polymer composition comprising a epoxy resin E1 and a multistage polymer.

The multistage polymer and the epoxy resin E1 are the same as defined before.

The epoxy resin comprising polymer composition can be cured.

In still another aspect the present invention concerns a thermoset resin obtained by curing the epoxy resin comprising polymer composition according to the invention.

DESCRIPTION OF DRAWINGS

[Figures]

METHODS OF EVALUATION

Optical Microscopy is done with a ZEISS model.

Atomic Force Microscopy (AFM) is performed with D3100 from the company VEECO in tapping mode. Two modes are used for acquiring images: height mode for obtaining the topography of the surface and phase contrast mode for obtaining the viscoelastic properties.

For the AFM the sample is broken and for obtaining a thin more or less smooth surface the sample is cooled down to −90° C. and cut with a microtome. The cut slices of the sample have a thickness of about 100 nm.

Particle Size Analysis

The particle size of the primary particles after the multistage polymerization is measured with a Zetasizer Nano S90 from MALVERN. The particle size of the polymer powder is measured with Malvern Mastersizer 3000 from MALVERN. For the estimation of volume median particle size D50 a Malvern Mastersizer 3000 apparatus with a 300 mm lenses, measuring a range from 0.5-880 μm is used.

Glass Transition Temperature

The glass transitions (Tg) of the multistage polymers is measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

EXAMPLES

Comparative Example 1

The multistage polymer latex (MP1) is prepared according to the technique described in U.S. Pat. No. 4,278.576, which employs a standard emulsion polymerization technique. Namely the core/shell acrylic polymer is prepared employing 84.2 parts of butyl acrylate, 0.4 parts of butylene glycol diacrylate and 0.4 parts of diallymaleate as elastomeric core, followed by a polymerization of 15 parts of methyl methacrylate. The solid content is 40%. The multistage polymer latex is dried by spray drying, a powder with less than 1% of residual volatiles is obtained.

The multistage polymer MP1 comprises an (meth)acrylic polymeric core having a Tg<−20° C. as first stage and a (meth)acrylic polymeric shell having a Tg>30° C. °C. as last stage.

The powder of the multistage polymer MP1 is dispered at room temperature (25° C.) with liquid epoxy resin (Huntsman LY556). An hardener polyetheramine (Huntsman, Jeffamnine T403) is added at room temperature. The blend is cured in oven at 120° C. during 2 h.

Figure 1:
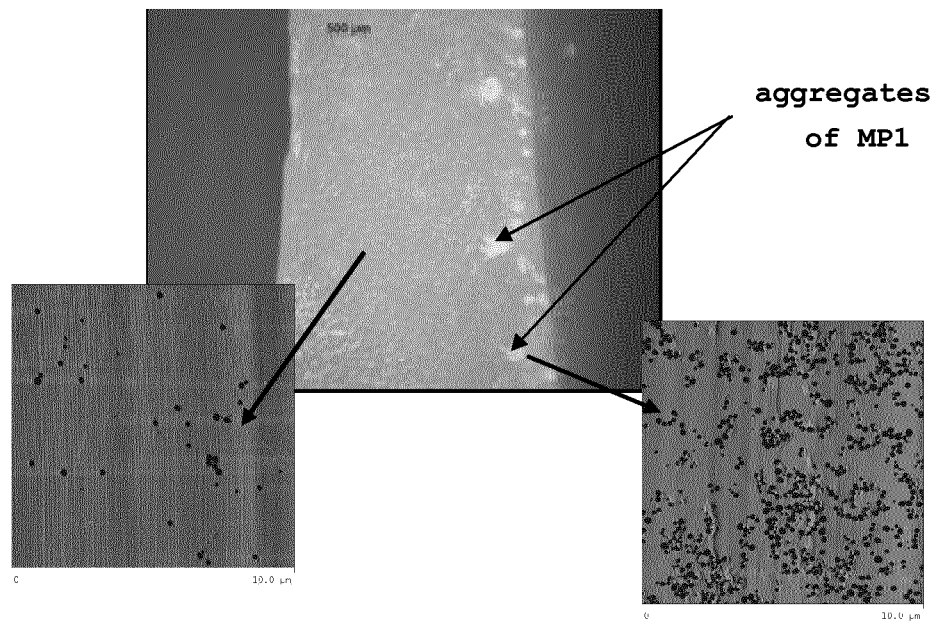
FIG. 1—Microscopy of comparative example 1: AFM and optical microscopy. The optical microscopy on the surface of a cut of the sample shows heterogeneities visible due to white spots. The AFM analysis in areas of the white spots shows a lot of aggregates of multistage polymer particles. In other areas much less multistage polymer particles are present with occasionally aggregates.

As presented in FIG. 1 the microscopy shows inhomogeneous distribution of the particles of the multistage polymer inside the cured epoxy resin. There are places where are nearly no particles and places where there are many particles and agglomerated particles due to bad dispersion capability inside the epoxy resin.

Comparative Example 2

The same multistage polymer latex (MP1) is prepared as in comparative example 1. The dispersion of MP1 is tried to be mixed with liquid epoxy resin (Huntsman LY556). No dispersion mixture of the two compounds is obtained that could be recovered or spray dried to obtain a solid powder at 20° C.

Example 1

The multistage polymer latex (MP1) is prepared according to the technique described in U.S. Pat. No. 4,278.576, which employs a standard emulsion polymerization technique. Namely the core/shell acrylic polymer is prepared employing 84.2 parts of butyl acrylate, 0.4 parts of butylene glycol diacrylate and 0.4 parts of diallymaleate as elastomeric core, followed by a polymerization of 15 parts of methyl methacrylate. The solid content is 40%.

2421 g of the multistage polymer latex (solid content is 40%) is mixed with 2096 g of an aqueous dispersion of solid epoxy resin (EPI-REZ™ Resin 3522-W-60 from Momentive Specialty Chemicals Inc./solid content is 59.2%) and 4054 g of de-ionized water. The dispersion mixture has a solid content of 30.6% and is dried by spray drying, a powder with less than 1% of residual volatiles is obtained.

This powder is dispersed at room temperature (25° C.) in the same epoxy resin (Huntsman LY556) and hardener polyetheramine (Huntsman, Jeffamnine T403) used in comparative example 1. The blend is cured in oven at 120° C. during 2 h.

Figure 2:
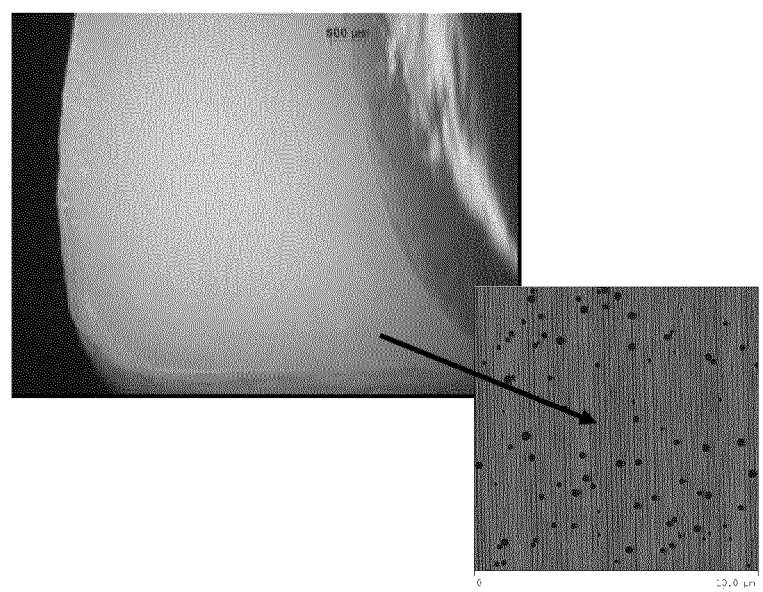
FIG. 2—Microscopy of example 1: AFM and optical microscopy. The optical microscopy on the surface of a cut of the sample shows homogeneity. The AFM analysis shows good distrubition of multistage polymer particles.

As presented in FIG. 2 the microscopy shows homogeneous distribution of the particles of the multistage polymer inside the cured epoxy resin. This is due to the good dispersion capability of the composition according to the invention inside the epoxy resin.

The invention claimed is:

1. A solid polymer composition comprising less than 3 wt % humidity and further comprising;
   an epoxy resin E1, said epoxy E1 is solid at a temperature below 25° C. and is chosen from the group consisting of resorcinol diglycidyl ether, bisphenol A diglycidyl ether, triglycidyl-p-amino-phenol, bromobisphenol F diglycidyl ether, the triglycidyl ether of m-aminophenol, tetraglycidylmethylenedianiline, the triglycidyl ether of (trihydroxy-phenyl)methane, polyglycidyl ethers of phenol-formaldehyde novolak, poly-glydidyl eithers of ortho-cresol novolak, tetraglycidyl ethers of tetraphenyl-ethane, and mixtures thereof, and
   a multi stage core shell polymer, wherein the multi stage core shell polymer makes up at least 30 wt % of the composition, said solid polymer composition being a solid polymer powder having a D10 particle size distribution in volume of at least 7µ and a D90 particle size distribution in volume of at most 950 µm.

2. The solid polymer composition according to claim 1 wherein the multi stage Core shell polymer comprises
   a) one stage (A) comprising a polymer (A1) having a glass transition temperature of less than 0° C.
   b), one stage (B) comprising a polymer (B1) having a glass transition temperature of at least 30° C.

3. The sold polymer composition according to claim 2 wherein polymers (A1) and (B1) are acrylic or methacrylic polymers.

4. The solid polymer composition according to claim 2 wherein polymer (A1) is a silicone rubber based polymer.

5. The solid polymer composition according to claim 2 wherein polymers (A1) comprises at least 50 wt % of polymeric units coming from isoprene or butadiene.

6. The solid polymer composition according to claim 2 wherein stage (A) is the first stage and stage (B) comprising polymer (B1) is grafted on stage (A) comprising polymer (A1).

7. The solid polymer composition according to claim 1 wherein the composition is in form of a sold polymer powder having a volume median particle size D50 between 1 µm and 500 µm.

8. The solid polymer composition according to claim 1 wherein the multi stage core shell polymer is a solid free flowing powder.

9. The solid polymer composition according to claim 1 wherein the composition is in form of a polymer powder comprising the epoxy resin E1, said epoxy E1 is solid at a temperature below 25° C., as a continuous phase and the multi stage polymer as dispersed phase.

10. A process for manufacturing a solid polymer composition comprising less than 3 wt % humidity, the process comprising the steps of;
    a) mixing of an epoxy resin E1, said epoxy E1 is solid at a temperature below 25° C. and is chosen from the group consisting of resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, poly-glycidyl ethers of ortho-cresol novolak, tetraglycidyl ethers of tetraphenyl-ethane, and mixtures thereof, and a multi stage core shell polymer,
    b) recovering the obtained mixture of previous step to obtain a sold polymer powder having a D10 particle size distribution in volume of at least 7µ and a D90 particle size distribution in volume of at most 950 µm.
wherein the epoxy resin E1 and the multi stage core shell polymer step a) are in form of a dispersion in aqueous phase, and
wherein the multistage polymer makes up at least 30 wt % of the solid polymer composition.

11. The process according to claim 10 wherein recovering step b) is made by coagulation or by spray drying.

12. An epoxy resin comprising polymer composition polymer composition comprising
    a) an epoxy resin E2 and
    b) the solid polymer composition according to claim 1.

* * * * *